(12) United States Patent
Allen et al.

(10) Patent No.: US 6,844,102 B2
(45) Date of Patent: Jan. 18, 2005

(54) AQUEOUS BASED ELECTROLYTE SLURRY FOR MCFC AND METHOD OF USE

(75) Inventors: Jeffrey Peter Allen, Naugatuck, CT (US); David A. Schoonmaker, Sandy Hook, CT (US)

(73) Assignee: GenCell Corporation, Southbury, CT (US)

( * ) Notice: Subject to any disclaimer, the term of this patent is extended or adjusted under 35 U.S.C. 154(b) by 309 days.

(21) Appl. No.: 10/083,856

(22) Filed: Feb. 27, 2002

(65) Prior Publication Data

US 2003/0162082 A1 Aug. 28, 2003

(51) Int. Cl.[7] .............................................. H01M 8/14
(52) U.S. Cl. ............................ 429/46; 429/13; 429/34
(58) Field of Search ............................. 429/13, 34, 46

(56) References Cited

U.S. PATENT DOCUMENTS

| | | | |
|---|---|---|---|
| 3,466,197 A | 9/1969 | Bawa | 136/86 |
| 4,581,303 A | 4/1986 | Pasco et al. | 429/46 |
| 5,468,573 A | * 11/1995 | Bregoli et al. | 429/16 |

FOREIGN PATENT DOCUMENTS

| | | | |
|---|---|---|---|
| EP | 0 689 258 | 12/1995 | |
| JP | 57-80675 | * 5/1982 | H01M/8/14 |
| JP | 61 271754 | 12/1986 | |
| JP | 62 154576 | 7/1987 | |
| WO | WO 00/08702 | 2/2000 | |

OTHER PUBLICATIONS

English abstract of JP 61 271754, Patent Abstracts of Japan, 0111(27) (E–501) (1987).
English abstract of JP 62 154576, Patent Abstracts of Japan, 0113(87) (E–566) (1987).

* cited by examiner

*Primary Examiner*—Dah-Wei Yuan
(74) *Attorney, Agent, or Firm*—Banner & Witcoff, Ltd.

(57) ABSTRACT

The present invention provides an aqueous-based electrolyte slurry for molten carbonate fuel cells. The invention provides means to eliminate the potential for the preferential transport of potassium carbonate and subsequent irreversible alteration of the 62/38 molar ratio of the eutectic mixture of the lithium potassium carbonate electrolyte.

8 Claims, 2 Drawing Sheets

AQUEOUS BASED ELECTROLYTE SLURRY FOR MCFC AND METHOD OF USE

This invention relates to molten carbonate fuel cells and to methods of storing electrolyte in molten carbonate fuel cells at the point of assembly.

BACKGROUND OF THE INVENTION

An electrochemical molten carbonate fuel cell stack consists of a plurality of assemblies comprising an anode electrode, an electrolyte filled matrix, a cathode electrode, and an interconnect plate or bipolar separator plate. The assemblies are arranged in series relationship to form the fuel cell stack.

A eutectic mixture of lithium carbonate and potassium carbonate in a ratio of 62 mole %/38 mole % is commonly used in molten carbonate fuel cells (MCFC) as an electrolyte. The eutectic mixture of lithium carbonate and potassium carbonate is commonly processed as a finely divided powder that is a solid at room temperature. The electrolyte may be pre-melted and re-processed to powder form. The two components of the electrolyte can also be purchased separately in bulk powder form and used as a simple physical mixture such as for example lithium potassium from Chemetall Foote Corporation product number 51039 and potassium carbonate from Harcros Chemicals, Incorporated, and no part number.

Methods of installing the electrolyte within the fuel cell at the point of assembly include the storage of said electrolyte within the electrodes or the electrolyte matrix of the fuel cell. These methods require that the electrolyte be evenly deposited upon the surface of said electrode or electrolyte matrix and the placement of the electrode/electrolyte assembly within an atmospherically controlled furnace and heating the assembly above the melting temperature of the electrolyte. An atmosphere within the furnace must be maintained with a partial pressure of carbon dioxide above that point that would result in decomposition of the carbonate electrolyte. Upon melting, the electrolyte will wick into the pores of said electrode or electrolyte matrix and be retained. Upon cooling, the electrolyte will solidify within the pores of said electrode or electrolyte matrix forming a highly fragile, glass-like sheet that is difficult to handle and process into the fuel cell assembly. Non-uniformity of distribution of the electrolyte within the electrode or electrolyte matrix results in variation of the mechanical properties of the electrode or electrolyte matrix such as compressive strength and permeability.

Another method of installing the electrolyte within the fuel cell at the point of assembly is the storage of said electrolyte within the flow channels of the bipolar separator plates of each cell of the fuel cell stack. Upon initial start-up of the fuel cell, the electrolyte will melt and wick into the porous electrodes and electrolyte matrix. Sufficient quantity of electrolyte is necessary to adequately fill the pores of the electrolyte matrix so as to create an impermeable seal that prevents mixing of reactant gasses. Additional electrolyte is required to wet the catalyst comprising the electrodes.

Another method of installing the electrolyte within the fuel cell at the point of assembly involves a combination of filled electrodes and filled flow channels.

Tape casting is a common method for producing MCFC electrodes. Tape cast electrodes are produced with polymer binders that result in very handle-able electrodes that are easily processed during the manufacturing process. It is desirable to avoid the added manufacturing processes associated with storage of electrolyte within the electrodes of the fuel cell during assembly.

Dry packing of electrolyte within the flow channels of the bipolar plate of the fuel cell presents manufacturing challenges that are not easily overcome. These challenges include storage of sufficient quantity of electrolyte to properly fill the pores of the electrolyte matrix to create the seal that prevents mixing of fuel cell reactants.

An alternative method of achieving sufficient packing density of the electrolyte in the flow channels is to prepare a slurry of powdered electrolyte and a solvent. Wet slurries achieve higher packing density than dry slurries. The slurry solvent may be any number of solvents or fluids that do not irreversibly alter the chemical composition of the electrolyte. Various solvents provide varying degrees of packing density of the electrolyte. U.S. Pat. No. 5,468,573 to Bregoli, et al teaches a method of preparing electrolyte slurry with a solvent comprising glycerin. The "573" patent states that aqueous based slurry is unsuitable due to water reacting with the electrolyte or other components.

SUMMARY

Aqueous-based electrolyte slurry has the distinct advantage of offering very high packing density and eliminating the inherent dangers of utilizing flammable type solvents such as alcohol and glycerin. Irreversible damage to the electrolyte can occur if a water based lithium/potassium carbonate electrolyte is not properly prepared, installed, and dried. The severity of the damage is increased if the fuel cell is assembled prior to at least partial drying of the electrolyte.

It is well known in the art that potassium is roughly one hundred times more soluble in water than is lithium. Precautions must be taken to avoid damage to the eutectic physical mixture of the lithium and potassium carbonates if a packed bed of electrolyte is chosen as the sole means of electrolyte delivery to the electrodes and electrolyte matrix, as is the case if the use of tape cast electrodes is the preferred means of manufacture. The physical mixture of the electrolyte can be altered by the migration of liquid phase water from the inner regions of the packed bed of electrolyte towards the outer surface of the packed bed of electrolyte. Liquid water migration has the effect of preferentially transporting potassium carbonate from the inner regions of the packed bed of electrolyte and re-depositing the potassium at the outer regions of the packed bed of electrolyte, where the water enters vapor phase during the drying process, due to the high solubility of potassium carbonate relative to lithium carbonate. The re-deposition of preferentially transported potassium carbonate results in an irreversible alteration of the 62/38 molar ratio of the eutectic mixture of the lithium potassium carbonate electrolyte.

The preferential transport is further aggravated if the cell is assembled while the electrolyte is still wet or damp. In this scenario, the water must migrate in liquid phase laterally along the packed flow channel through the electrolyte in order to exit the fuel cell. This lateral migration of liquid phase water results in greater preferential transport of potassium and subsequent re-deposition at the end of the flow channel.

During the subsequent initial start-up of the fuel cell, the temperature of the fuel cell is raised through the melting temperature of the eutectic electrolyte mixture. It is well known in the art that a lithium potassium carbonate in a eutectic mixture of 62 mole % lithium and 38 mole % potassium will melt at about 493 degrees centigrade. However, the re-deposition of preferentially transported potassium carbonate has altered the eutectic mixture and hence the melting point. It is further well known in the art that potassium carbonate has a melting temperature of 891 degrees centigrade. The melting temperature of potassium carbonate is well above the 650 degree centigrade operating temperature of the molten carbonate fuel cell. As a result, the re-deposited, preferentially transported, potassium carbonate does not melt and remains as a solid deposit within the flow channel of the bipolar separator plates of the fuel cell.

Additionally, the deposit of un-melted potassium carbonate has the adverse effect of restricting the flow of reactant gasses through the flow channels of the bipolar plate. The restriction of reactant gas flow results in an elevation of the pressure required to flow a given quantity of reactants through the bipolar plate. Restricted flow paths result in increased loss of reactants through leakage and subsequent diminished performance of the fuel cell.

It is an object of the present invention to provide an aqueous-based electrolyte slurry for molten carbonate fuel cells. It is a further object of the present invention to provide means to eliminate the potential for the preferential transport of potassium carbonate and subsequent irreversible alteration of the 62/38 molar ratio of the eutectic mixture of the lithium potassium carbonate electrolyte.

BRIEF DESCRIPTION OF THE SEVERAL VIEWS OF THE DRAWING

The aspects of the invention will become apparent upon reading the following detailed description in conjunction with the accompanying drawings, in which.

DETAILED DESCRIPTION OF THE INVENTION

Figure 1:
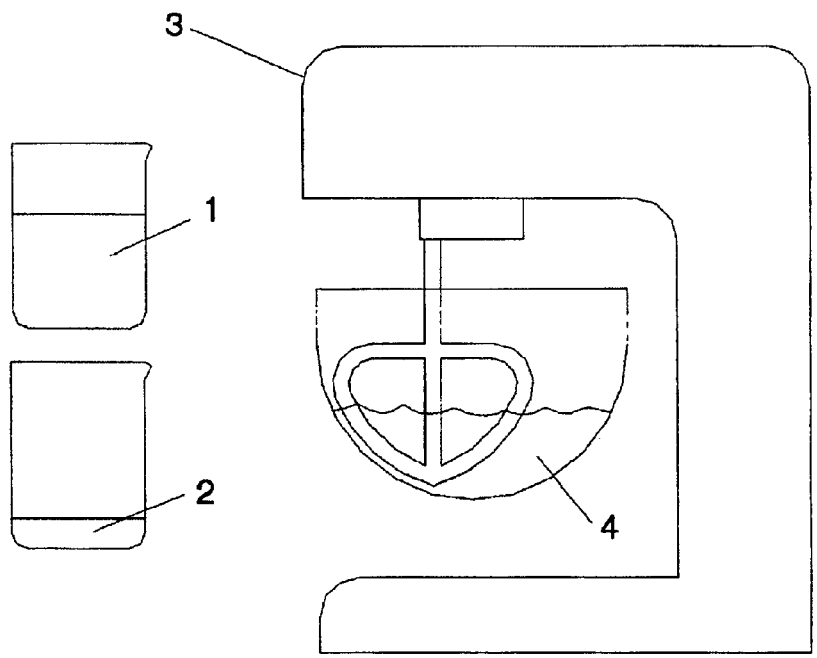
FIG. 1 illustrates a side view of a mixing system.

In FIG. 1 a physical mixture of 62 mole %/38 mole % lithium/potassium carbonate 1 is combined with distilled water 2 in a ratio of between 3.75:1 and 5:1 by weight in a Kitchen Aid Heavy Duty mixer 3 and blended at medium speed for thirty seconds to produce electrolyte slurry 4.

Figure 2:
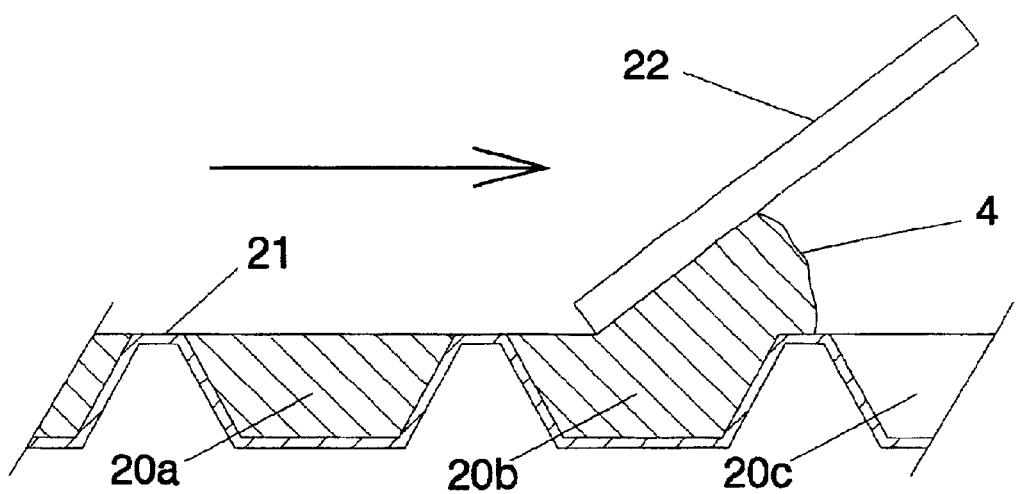
FIG. 2 illustrates a cross-section of an electrolyte slurry filled flow channel of a bipolar separator plate.

In FIG. 2 electrolyte slurry 4 is loaded into a plurality of flow channels 20a, 20b, 20c of bipolar separator plate 21 using spreader 22. If the surface of the electrolyte slurry glistens with liquid water the ratio of electrolyte to water should be adjusted to produce dryer slurry that does not glisten when loaded into bipolar plate 21 with spreader 22.

Figure 3:
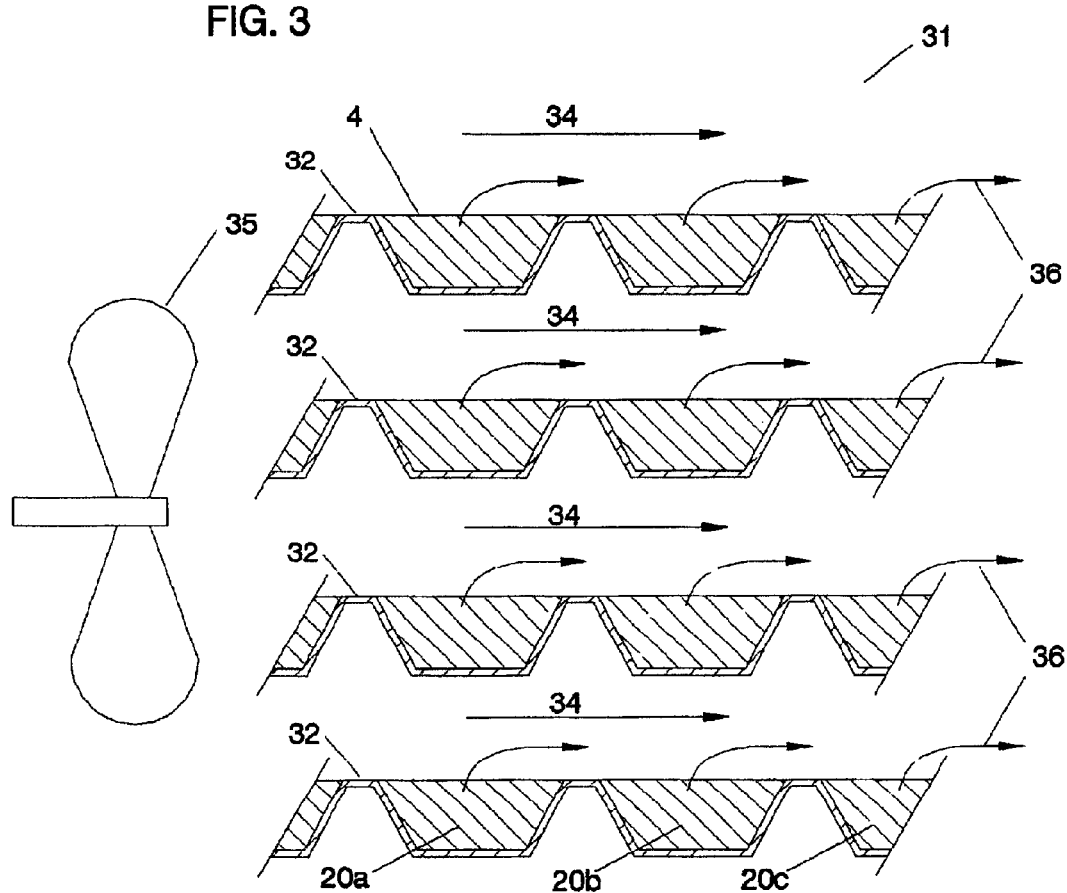
FIG. 3 illustrates a cross-section of an assembly for drying electrolyte slurry filled bipolar separator plates.

In FIG. 3 controlled drying of the slurry 4 prior to installation of the electrode onto flow channels 20a, 20b, 20c of bipolar plates 21 ensures that preferential transport of potassium does not occur. Drying is achieved in an arrangement 31 comprised of a plurality of electrolyte loaded bipolar plates 32 stacked with spacers that permit flow of ambient air 34 driven by fan 35 so as to achieve only evolution of water vapor 36 from the slurry 4.

Figure 4:
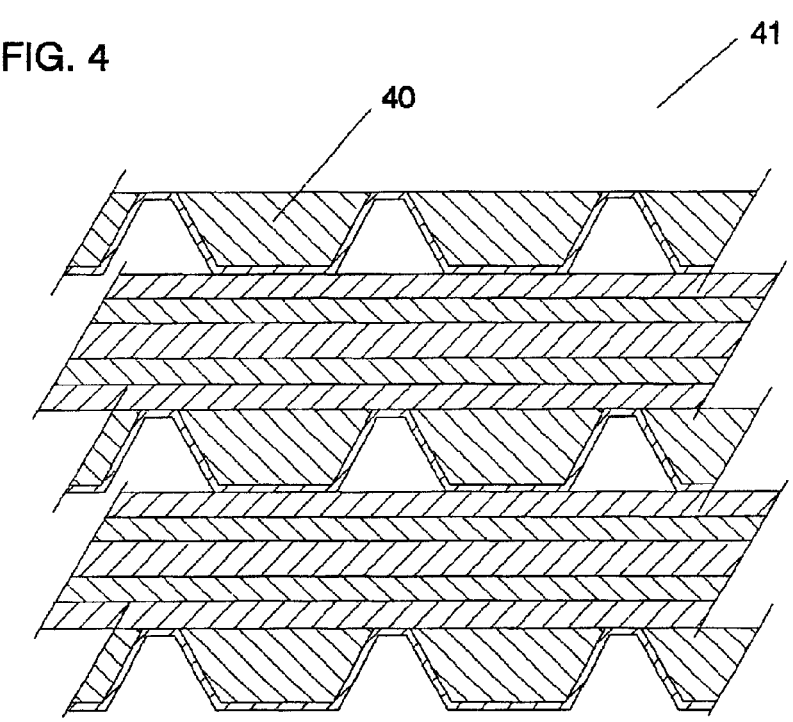
FIG. 4 illustrates a cross-section of an assembled fuel cell with electrolyte filled flow channels on the cathode side of the electrolyte matrix.

In FIG. 4 the dried slurry 40 is sufficiently desiccated such that, upon assembly of the fuel cell 41, the remaining water content of the slurry is insufficient to result in physical preferential transport of potassium carbonate upon initial heating of the fuel cell above 100 degrees centigrade The drying operation can alternatively be performed in a continuous mode using a simple ventilated tunnel/conveyor assembly.

In other preferred embodiments, off-eutectic mixtures of lithium/potassium carbonates, as well as other eutectic mixtures of lithium/carbonate electrolytes, as well as eutectic and off-eutectic mixtures of other carbonate electrolytes such as lithium/sodium carbonates may be utilized in the methods described herein. Additional embodiments further include other additives to the electrolyte mixture such as rare earth additives such as calcium carbonate and magnesium carbonate that may promote stability of particle size of the electrodes and electrolyte matrix that may be added as components to the electrolyte mixtures described herein.

It will be appreciated that the present invention is not restricted to the particular embodiment that has been described and illustrated, and that variations may be made therein without departing from the scope of the invention.

We claim:

1. A method for providing a supply of electrolyte to a molten carbonate fuel cell, said method comprising the steps of:
   a) preparing an aqueous-based slurry paste of electrolyte, said aqueous-based slurry comprising solid electrolyte particles dispersed in a carrier vehicle;
   b) spreading said slurry paste into flow channels of one or more bipolar plates during assembly so as to completely fill said flow channels;
   c) drying said slurry paste, and
   d) installing a current collector and an electrode onto the flow channels of said bipolar plate.

2. The method of claim 1 wherein said carrier vehicle is present in the slurry in the amount of about 27%.

3. The method of claim 1 wherein said carrier vehicle is water.

4. A molten carbonate fuel cell comprising a cathode electrode and an anode electrode each having a matrix side and a flow field side, said matrix side of said anode electrode and said matrix side of said cathode electrode positioned on either side and in contact with an electrolyte matrix, wherein the anode electrode is in contact with a first flow field on the flow field side of the anode electrode, wherein the cathode electrode is in contact with a second flow field on the flow field side of the cathode electrode, and wherein at least one of the first flow field and second flow field contains a packed bed of dried electrolyte,
   wherein the packed bed of dried electrolyte is prepared by spreading an aqueous-based slurry of solid electrolyte particles dispersed in a carrier into at least one of the first flow field and second flow field and drying the slurry.

5. The fuel cell of claim 4 wherein the carrier is water.

6. The method of claim 1, wherein the aqueous-based slurry paste is dried by flowing ambient air over the bipolar plates.

7. The method of claim 1, wherein the electrolyte comprises lithium carbonate and potassium carbonate.

8. The method of claim 7, wherein the electrolyte comprises 62 mole % lithium carbonate and 38 mole % potassium carbonate.

* * * * *